United States Patent [19]

New

[11] Patent Number: 5,072,146

[45] Date of Patent: Dec. 10, 1991

[54] MAGNETIC BEARINGS COIL HEAT REMOVAL

[75] Inventor: Nigel H. New, Harrow, United Kingdom

[73] Assignee: The Glacier Metal Company Limited, United Kingdom

[21] Appl. No.: 558,496

[22] Filed: Jul. 27, 1990

[30] Foreign Application Priority Data

Aug. 4, 1989 [GB] United Kingdom ............... 8917877

[51] Int. Cl.[5] ..................... H02K 3/487; H02K 9/22
[52] U.S. Cl. .................................. 310/90.5; 310/64; 310/214
[58] Field of Search ............... 310/64, 90.5, 208, 214, 310/270; 336/61

[56] References Cited

U.S. PATENT DOCUMENTS

| | | | |
|---|---|---|---|
| 3,810,303 | 5/1974 | Hoell | 336/61 |
| 3,913,045 | 10/1975 | Von Starck | 336/61 |
| 4,180,296 | 12/1979 | Habermann | 310/90.5 |
| 4,345,175 | 8/1982 | Jones | 310/214 |
| 4,409,502 | 10/1983 | McCabria | 310/214 |
| 4,900,964 | 2/1990 | Ying et al. | 310/214 |

Primary Examiner—Steven L. Stephan
Assistant Examiner—D. L. Rebsch
Attorney, Agent, or Firm—Nixon & Vanderhye

[57] ABSTRACT

A magnetic bearing assembly includes at least one electromagnet with a coil at least partially enclosed by a ferrogmagnetic core. Because of this arrangement, heat, inevitably generated within the coil in a conventional bearing, may cause the temperatures of the coil and adjacent parts of the electromagnet to rise to unacceptable values. These temperatures are reduced by placing a heat conducting member, say of copper, contiguous with the coil, and possibly inserted into the coil. Heat is conducted at a high rate to an exposed portion of the member, and is extracted efficiently therefrom by windage, or air flow, created within the apparatus having the magnetic bearing. Advantageously, the exposed portion of the heat conducting member has an extensive surface.

5 Claims, 2 Drawing Sheets

MAGNETIC BEARINGS COIL HEAT REMOVAL

The present invention relates to magnetic bearings, comprising either axial magnetic bearings, for accepting axial thrust loads; or radial magnetic bearings.

A problem with known magnetic bearings is that the coil of each provided electromagnet is at least partially enclosed by the ferromagnetic core of the electromagnet, possibly only the face of the coil, at least substantially in the same plane as the exposed pole faces provided by the core, being exposed. Inevitably heat is generated within the coil, and the temperatures of the coil, and adjacent parts of the electromagnet, rise in use. Because of the mounting of the coil in close relationship to the core of the electromagnet it is difficult to extract heat from the coil. Usually the material of the ferromagnetic core has only a moderate coefficient of thermal conductivity, so that the rate of heat extracted from the coil, by the relatively massive, contiguous core, is low. Hence, with known constructions for magnetic bearings, the current flowing in the coil, and the thrust capable of being provided by the electromagnet, may be limited, in order to avoid undesirable temperature rises within the coil and adjacent parts of the electromagnet. The electrical resistance of a coil increases with any rise in temperature of the coil, any such increase in the resistance being undesirable.

It is an object of the present invention, therefore, to provide a magnetic bearing assembly in which heat can be extracted from the coil of each electromagnet at a higher rate than for a conventional, corresponding magnetic bearing assembly.

According to the present invention a magnetic bearing assembly including at least one electromagnet, the electromagnet having at least one coil and a ferromagnetic core, the coil being at least partially enclosed by the core, has a member, of a material with a high coefficient of thermal conductivity, contiguous with the coil, but having an exposed portion, and the member is arranged to conduct heat away from parts of the coil contiguous with the core, to the exposed portion of the member.

At the exposed portion of the heat conducting member, heat is extracted efficiently by windage, or air flow, created within the apparatus including the magnetic bearing, when the apparatus is in use. Because of the presence of the heat conducting member contiguous with the coil, heat generated within the coil is removed at a high rate, and the temperatures of the coil and adjacent parts of the electromagnet, do not rise as much as in a conventional, corresponding magnetic bearing assembly.

It is required that the heat conducting member has a high coefficient of thermal conductivity, greater than 0.45, and preferably 0.90, cals. per cm sec. °C. Advantageously, the heat conducting member is of copper. It is essential that the material of the heat conducting member is not ferromagnetic.

Desirably, the heat conducting member comprises an insert within the coil, possibly substantially bisecting the coil.

In addition, or alternatively, the exposed portion of the heat conducting member has an extensive surface, from which heat is to be extracted. The heat conducting member may have an extensive surface extending over the otherwise exposed surface of the associated coil. Alternatively, for each coil, the heat conducting member may have an extensive surface extending radially in relation to the shaft, and parallel with, and spaced from, the ferromagnetic core.

Each coil of a magnetic bearing assembly may have a plurality of heat conducting members contiguous therewith, the members being arranged with radially extending gaps therebetween. Each coil may have two heat conducting members contiguous therewith, each member having a portion contiguous with the coil and extending around substantially one half of the coil, there being two radially extending gaps between the two members, and each member having an exposed portion.

In order that the present invention may be more fully understood examples will now be described, by way of illustration only, with reference to the accompanying drawings, of which:

Figure 4:
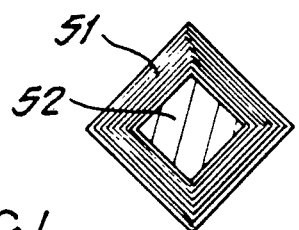
FIG. 4 is a section on the line IV—IV of FIG. 3, of a coil and a pole piece of the known magnetic bearing.
Figure 5:
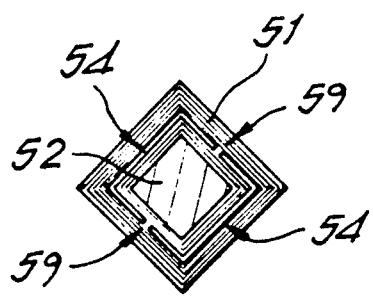
Figure 6:
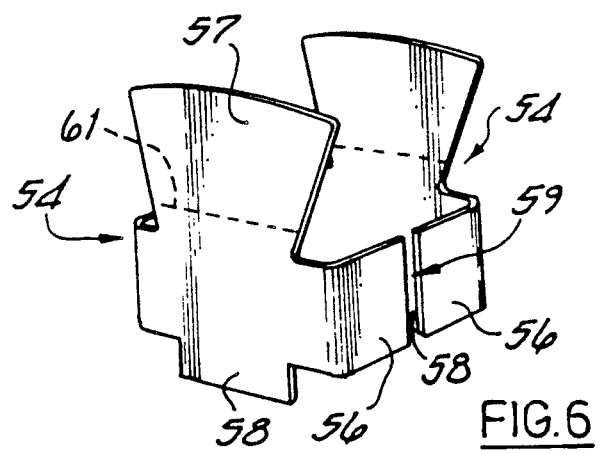
Figure 7:
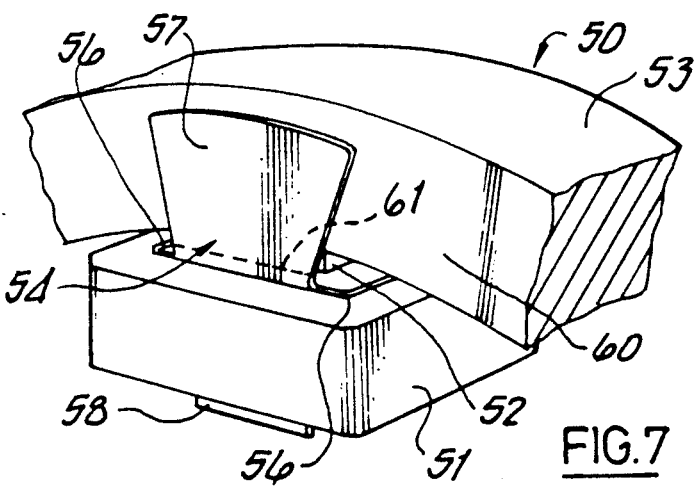
Figure 8:
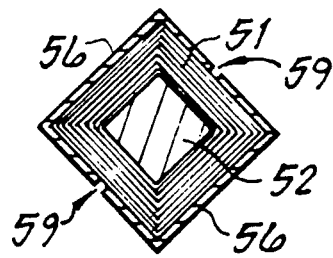

FIG. 5 corresponds to FIG. 4, and shows a modification of the radial magnetic bearing, there being two spaced heat conducting members incorporated in the coil;

FIG. 6 is a perspective view of the two heat conducting members of FIG. 5, in the arrangement the members have when within the coil;

FIG. 7 is a perspective view of a coil, and part of a ferromagnetic core, of the modified radial magnetic bearing, showing the arrangement of one of the heat conducting members in relation to the core; and FIG. 8 corresponds to FIG. 5, and shows the two spaced heat conducting members being contiguous to a coil, instead of comprising inserts therein.

Figure 1:
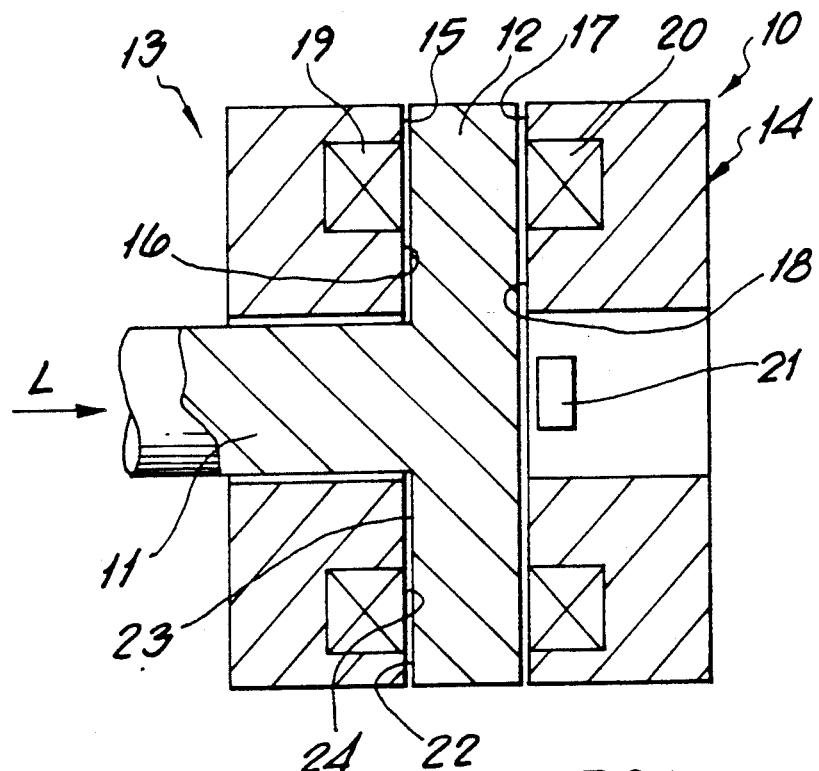
FIG. 1 shows a schematic section through a prior art axial magnetic thrust bearing, capable of balancing thrust forces in both possible directions along the shaft axis.

Referring to FIG. 1, where a conventional axial magnetic thrust bearing is indicated generally at 10, the bearing assembly comprises a shaft 11 which is supported by either conventional mechanical journal bearings (not shown) or radial magnetic bearings (not shown). The shaft has a rotor disc 12 which is shown at the shaft end but may be intermediate the shaft. Two stationary annular electromagnets 13 and 14 are shown. The magnets 13 and 14 comprise equal pole face areas 15, 16 and 17, 18, provided by a ferromagnetic core; together with annular coils 19, 20. An external thrust load, "L", is applied to the shaft in the direction of the arrow. An axial position sensor 21 senses the axial position of the rotor disc 12 and, via a known control system (not shown), the current to the coil 19 of the electromagnet 13 is varied to maintain the clearance 22 between the rotor face 23 and the face 24 of the electromagnet 13 substantially constant. The second electromagnet 14 only comes into operation if the direction of the applied thrust load is reversed for some reason. Usually, the ferromagnetic core providing the pole pieces is of steel, and has a coefficient of thermal conductivity of approximately 0.1 cal. per cm. sec. °C.

Figure 2:
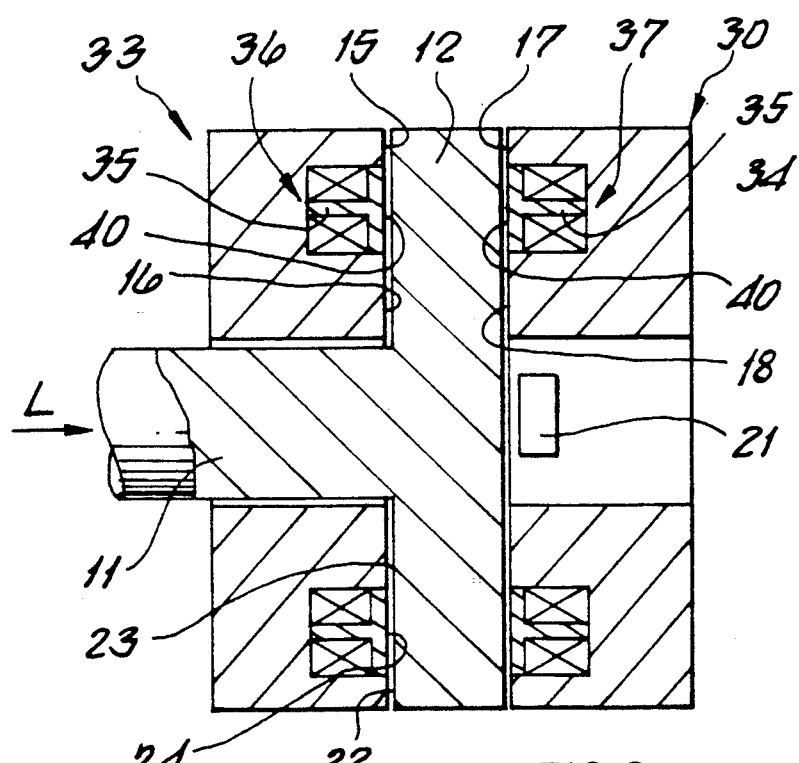
FIG. 2 shows a schematic section through the axial magnetic bearing of FIG. 1, modified in accordance with the present invention, so that a heat conducting member is incorporated within the coil of each electromagnet.

FIG. 2 shows the magnetic thrust bearing of FIG. 1 modified in accordance with the present invention, and in a manner which overcomes the disadvantage of the poor rate of extraction of heat from the coils of the electromagnets of the known arrangement. There is poor heat extraction from the coils of the known arrangement because the coils are substantially enclosed by the cores of the electromagnets; and because the wire forming the coils is covered with electrical insulation which, usually, also comprises a good heat insulator.

Parts of the magnetic bearing assembly 30 of FIG. 2 identical to, or closely resembling, parts of the magnetic bearing assembly 10 of FIG. 1 are identified by the same reference numerals in both Figures.

However, the electromagnets 33 and 34 of the magnetic bearing assembly 30 of FIG. 2 are modified by having an annular member 35, of a material with a high coefficient of thermal conductivity, say, of copper, being inserted into each of the coils 36 and 37, respectively, of the electromagnets 33 and 34. Each annular, heat conducting member 35, substantially bisects the associated coil 36 or 37. Each annular coil 36 or 37, may comprise constituent radially inner and outer coils, together comprising the single required coil. Each member 35 extends throughout the width of the associated coil along the axis of the shaft (not shown), and has an exposed portion 40, at the otherwise exposed surface of the coil at least substantially in the same plane as the surfaces 15 and 16 of the poles of the electromagnet. The exposed portion 40 of the heat conducting member 35 has an extensive surface, extending over the otherwise exposed surface of the coil.

In the operation of the apparatus including the magnetic bearing, windage, or an air flow, is created, and inevitably this passes over the opposing surfaces within the magnetic bearing, and, in particular, over the extensive surface provided by the exposed portion 40 of the heat conducting member 35. Thus, heat is extracted efficiently from the coil 36 or 37, and the temperatures of the coils, and of adjacent parts of the electromagnets, are lower than otherwise would be the case.

It is required to ensure that the heat conducting member 35 which, usually, is also of a good electrically conducting material, does not inadvertently form a shorted turn in the associated magnetic circuit. For this reason the heat conducting member 35 has two spaced parts, (not shown), to prevent induced circulating currents.

Where appropriate, in this specification, and the accompanying claims, such a combination of a plurality of separate heat conducting parts for a coil can be considered either as a single heat conducting member, or as a plurality of heat conducting members.

As for the known axial magnetic assembly of FIG. 1, the modification thereof in accordance with the present invention, and shown in FIG. 2, has a known control system, employing an axial position sensor and closed loop feed back control circuitry, to control the power applied to the electromagnets, in order to maintain substantially constant clearance between each electromagnet pole face and the associated rotor thrust face.

Figure 3:
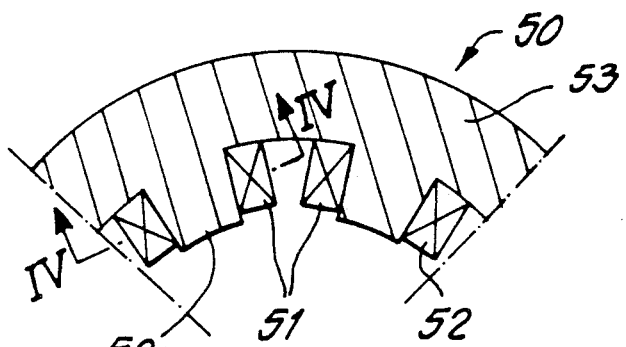
FIG. 3 is a schematic section of part of a prior radial magnetic bearing.

FIG. 3 shows a quadrant of a known form of radial magnetic bearing 50, and, in particular, shows two adjacent coils 51 of the bearing, each col encircling a pole piece 52, integral with the main part 53 of a ferromagnetic core. In addition to each coil 51 being contiguous with the associated pole piece 52, it is also contiguous with the main part 53 of the core, and so is partially enclosed by the core.

The radial magnetic bearing 50 is controlled by an appropriate control system, so that there is maintained a constant clearance between the shaft (not shown) associated with the bearing, and each exposed electromagnet pole face of the bearing.

A section on the line IV—IV of FIG. 3 is shown in FIG. 4, and indicates that a pole piece 52 is a solid square in section, and that the associated coil 51 has in section the shape of a hollow square.

In accordance with the present invention, the radial magnetic bearing 50 of FIGS. 3 and 4 is modified as shown in FIGS. 5 and 7. In particular, two heat conducting members 54, of copper, and fully shown in FIG. 6, are inserted into each coil 51 of the bearing. In FIG. 6 the two heat conducting members 54 are shown in the relationship they have to each other when inserted into the coil 51. Each heat conducting member 54 has a 'U'-section portion 56; a portion 57 in the shape of a sector of a circle, and in the same plane as, and extending on one side of, the base part of the 'U'-section portion 56; and a rectangular portion 58, also in the same plane as, but extending on the other side to that of the sector-shaped portion 57 of, the base part of the 'U'-section portion 56. Only the 'U'-section portions 56 are inserted into the coil 51; and the other two portions 57 and 58, of each heat conducting member 54, extend on either side of the coil 51, to be exposed externally of the coil.

Together, the 'U'-section portions 56 of the two heat conducting members 54, in section, almost define a hollow square. Eddy currents, induced in the members 54 when the coil is activated, are prevented by leaving gaps 59 between the two heat conducting members 54 when inserted in the coil 51, which gaps extend radially in relation to the shaft.

As shown in FIG. 7, with the heat conducting members 54 inserted in the coil, and the coil encircling a pole piece 52, the sector-shaped portion 57 of each heat conducting member, which extends radially in relation to the shaft, extends parallel with, but is spaced from, one major surface 60 of the main part 53 of the ferromagnetic core. Thus, in the operation of the bearing, there is an air flow over both major surfaces of each sector-shaped portion 57, causing there to he a high rate of extraction of heat from the member 54. Similarly, the rectangular-shaped portion 58 of each heat conducting member 54 extends parallel with, but is spaced from, one major surface, not shown, of the outer part of the associated pole piece 52, further facilitating the extraction of heat from the member.

The control system for the modified radial magnetic bearing of FIGS. 5 to 7 is the same as that for the known radial magnetic bearing of FIGS. 3 and 4.

The arrangement may be such that the exposed portion of the, or each, heat conducting member is not required to have an extensive surface, in order that heat to be extracted from the associated coil at a desired rate. Thus, the sector-shaped portion 57 of each heat conducting member 54 may be truncated as indicated by the broken line 61 in FIGS. 6 and 7.

FIG. 8 corresponds to FIG. 5, and indicates the 'U'-section portion 56 of each heat conducting member 54 being contiguous with the coil 51, instead of being an insert therein.

The, or each, heat conducting member may be of any convenient non-ferromagnetic material.

I claim:

1. In a magnetic bearing assembly including at least one electromagnet, the electromagnet having at least one coil and a ferromagnetic core, said at least one coil being at least partially engaged and enclosed by said ferromagnetic core, such that at least one surface of said at least one coil is exposed, the improvement comprising heat conducting means having a high coefficient of thermal conductivity in surface engagement with said at least one coil and including at least one portion extending beyond said coil and facing away from said ferromagnetic core for conducting heat away from said coil, wherein said bearing assembly is an axial bearing assembly having at least one electromagnet having at least one pole face area opposite to and spaced from an annular rotor disc, wherein said heat conducting means comprises at least one member having a high coefficient of thermal conductivity inserted within the coil of said at least one electromagnet such that said one portion covers the otherwise exposed surface of said annular coil.

2. In a magnetic bearing assembly including at least one electromagnet, the electromagnet having at least one coil and a ferromagnetic core, said at least one coil being at least partially engaged and enclosed by said ferromagnetic core, such that at least one surface of said at least one coil is exposed, the improvement comprising heat conducting means having a high coefficient of thermal conductivity in surface engagement with said at least one coil and including at least one portion extending beyond said coil and facing away from said ferromagnetic core for conducting heat away from said coil, wherein said bearing assembly is a radial bearing assembly having a plurality of coils encircling respective pole pieces integrally formed with said core, said heat conducting means comprising, for each of said plurality of coils, a pair of spaced heat conducting members located in close proximity to one another, each of said heat conducting members having a substantially U-shaped section in engagement with said coil and at least one additional section extending beyond and away from said coil.

3. The magnetic bearing assembly of claim 2 wherein said pair of heat conducting members each extend around about one half of said coil.

4. The magnetic bearing assembly of claim 3 wherein said pair of heat conducting members extend about peripheral surfaces of said coil.

5. The magnetic bearing assembly of claim 3 wherein said pair of heat conducting members are inserted within said coil.

* * * * *